(12) United States Patent
Kim (10) Patent No.: US 11,146,156 B2
(45) Date of Patent: Oct. 12, 2021

(54) STATOR FOR A HIGH EFFICIENCY MOTOR AND MANUFACTURING METHODS THEREOF

(71) Applicants: HYUNDAI MOTOR COMPANY, Seoul (KR); KIA MOTORS CORPORATION, Seoul (KR)

(72) Inventor: Young Min Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 113 days.

(21) Appl. No.: 16/717,455

(22) Filed: Dec. 17, 2019

(65) Prior Publication Data
US 2020/0127543 A1 Apr. 23, 2020

Related U.S. Application Data

(62) Division of application No. 15/374,800, filed on Dec. 9, 2016, now Pat. No. 10,547,232.

(30) Foreign Application Priority Data

Oct. 21, 2016 (KR) .................. 10-2016-0137800

(51) Int. Cl.
*H02K 15/12* (2006.01)
*H02K 1/02* (2006.01)
(Continued)

(52) U.S. Cl.
CPC .............. *H02K 15/12* (2013.01); *H02K 1/02* (2013.01); *H02K 1/146* (2013.01); *H02K 1/148* (2013.01);
(Continued)

(58) Field of Classification Search
CPC .. H02K 15/12; H02K 15/125; H02K 15/0018; H02K 3/493; H02K 1/148;
(Continued)

(56) References Cited

U.S. PATENT DOCUMENTS 3,616,056 A 10/1971 Sims
5,348,800 A 9/1994 Moro et al.
(Continued)

FOREIGN PATENT DOCUMENTS

CN 103166335 A 6/2013
GB 353180 A 7/1931
(Continued)

OTHER PUBLICATIONS

Office Action cited in corresponding Chinese application No. 201710070496.3; dated Jul. 20, 2020; 6 pp.
(Continued)

*Primary Examiner* — Livius R. Cazan
(74) *Attorney, Agent, or Firm* — Lempia Summerfield Katz LLC (57) ABSTRACT

A stator for a high efficiency motor, and a manufacturing method of such a stator, the stator including a stator core partitioned into a center hole and inner spaces. The stator core includes a yoke portion and a plurality of teeth. The stator includes coils coiled around the plurality of teeth, respectively, and filling parts filling the inner spaces, respectively. The filling parts are configured to prevent magnetic flux leakage from occurring between the coils coiled around the plurality of teeth.

3 Claims, 8 Drawing Sheets

(51) Int. Cl.
  *H02K 1/14*  (2006.01)
  *H02K 3/18*  (2006.01)
  *H02K 15/02*  (2006.01)
  *H02K 15/00*  (2006.01)

(52) U.S. Cl.
  CPC ........... *H02K 3/18* (2013.01); *H02K 15/0018* (2013.01); *H02K 15/022* (2013.01); *Y10T 29/49009* (2015.01)

(58) Field of Classification Search
  CPC .......... H02K 3/18; H02K 1/02; H02K 15/022; Y10T 29/49009
  See application file for complete search history.

(56) References Cited

U.S. PATENT DOCUMENTS

| | | | |
|---|---|---|---|
| 8,187,394 | B2 | 5/2012 | Ye et al. |
| 8,427,017 | B2 | 4/2013 | Nakanishi et al. |
| 8,575,815 | B2 * | 11/2013 | Jang ................. H02K 3/522 |
| | | | 310/216.009 |
| 8,683,675 | B2 | 4/2014 | Yuya et al. |
| 8,716,914 | B2 | 5/2014 | Tanaka et al. |
| 9,154,020 | B2 | 10/2015 | Deguchi et al. |
| 9,306,421 | B2 | 4/2016 | Lee |
| 9,484,781 | B2 | 11/2016 | Lee |
| 2004/0001974 | A1 | 1/2004 | Sharrock |
| 2012/0151750 | A1 | 6/2012 | Yuya et al. |
| 2013/0049493 | A1 * | 2/2013 | Zhao ................... H02K 1/28 |
| | | | 310/43 |
| 2013/0147287 | A1 | 6/2013 | Lee |
| 2014/0009009 | A1 | 1/2014 | Deguchi et al. |
| 2016/0172917 | A1 | 6/2016 | Lee |
| 2016/0285337 | A1 * | 9/2016 | Huber ..................... C08K 3/08 |

FOREIGN PATENT DOCUMENTS

| | | |
|---|---|---|
| JP | 59123437 A | 7/1984 |
| JP | H05109520 | 4/1993 |
| JP | 2003158842 | 5/2003 |
| JP | 2004039218 | 2/2004 |
| JP | 2014017915 | 1/2014 |
| KR | 1020050096723 A | 6/2005 |
| KR | 1020100109558 A | 10/2010 |
| KR | 1020120018774 A | 3/2012 |
| KR | 1020120085292 | 7/2012 |
| KR | 101477582 B1 | 1/2015 |

OTHER PUBLICATIONS

KR NOA 12282018, Notice of Allowance cited in the corresponding Korean patent application No. 10-2016-0137800; dated Dec. 28, 2018; 5 pages.

KR Office Action 07032018, Office Action in corresponding Korean Patent Application No. 10-2016-0137800; dated Jul. 3, 2018; 6 pages.

KR Office Action dated 20180115, Office Action in corresponding Korean Patent Application 10-2016-0137800, dated Jan. 15, 2018; 4 pages.

* cited by examiner

STATOR FOR A HIGH EFFICIENCY MOTOR AND MANUFACTURING METHODS THEREOF

CROSS REFERENCE TO RELATED APPLICATION

This application is a division of U.S. patent application Ser. No. 15/374,800 entitled "STATOR FOR A HIGH EFFICIENCY MOTOR AND MANUFACTURING METHODS THEREOF" and filed Dec. 9, 2016, and which claims priority to Korean Patent Application No. 10-2016-0137800, filed in the Korean Intellectual Property Office on Oct. 21, 2016. The entire contents of these prior filed applications are incorporated herein by reference.

BACKGROUND

1. Field

The present disclosure relates generally to a stator for a motor and a manufacturing method thereof. More particularly, the present disclosure relates to a manufacturing method of a stator for a high efficiency motor whereby the stator is capable of improving performance of the motor by minimizing magnetic flux leakage and iron loss generated between teeth of the stator with coils coiled around the teeth.

2. Description of the Related Art

A motor converting electric energy into a rotational force as a power source for driving a vehicle may be provided in an eco-friendly vehicle, such as an electric vehicle, a hybrid electric vehicle, or a fuel cell vehicle.

The motor includes a stator and a rotor. The stator is installed inside a housing of the motor, and the rotor is disposed inside the stator.

Figure 1:
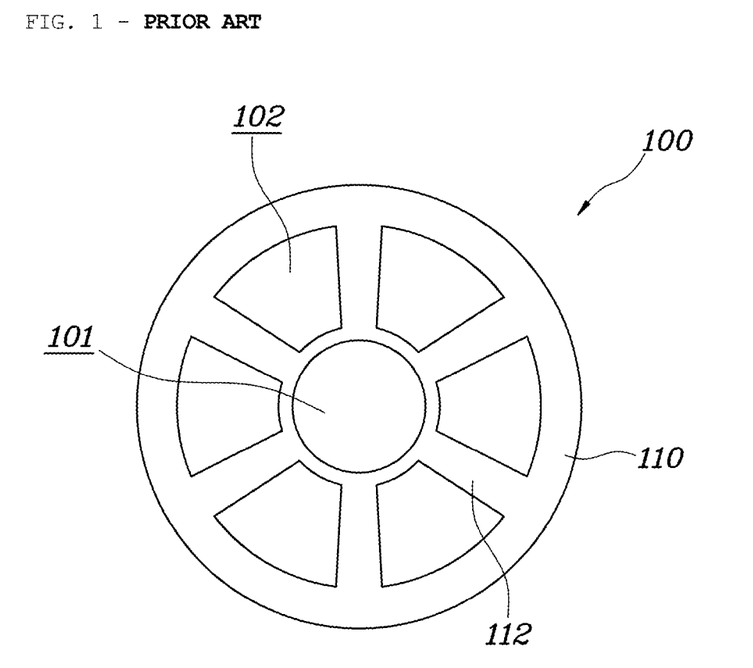
FIG. 1 is a view illustrating an integrated stator according to the related art.
Figure 2:
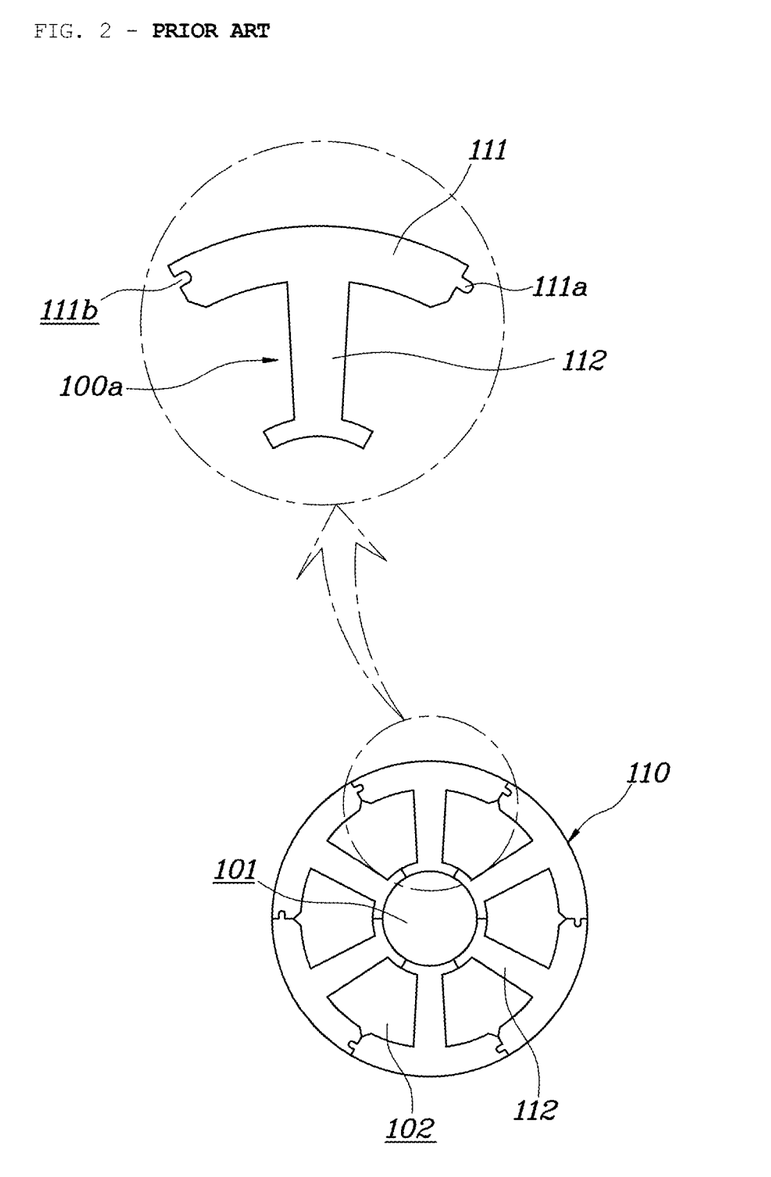
FIG. 2 is a view illustrating a stator provided by using split cores according to the related art.

FIG. 1 is a view illustrating an integrated stator according to the related art, and FIG. 2 is a view illustrating a stator provided by using split cores according to the related art.

As shown in FIGS. 1 and 2, in a stator of a motor according to the related art, the stator including a yoke portion 110 and a plurality of teeth 112 is integrally provided such that a center hole 101 and inner spaces 102 are formed in the stator. Alternatively, the stator is provided in such a way that a plurality of split cores 100a is disposed in a ring shape. In this regard, the split cores 100a include: back yokes 111 formed along outer circumference of the stator; and teeth 112 protruding from the back yokes 111 toward the center of the stator of the motor. Further, coils 200 made of copper are coiled around the teeth 112.

Figure 3:
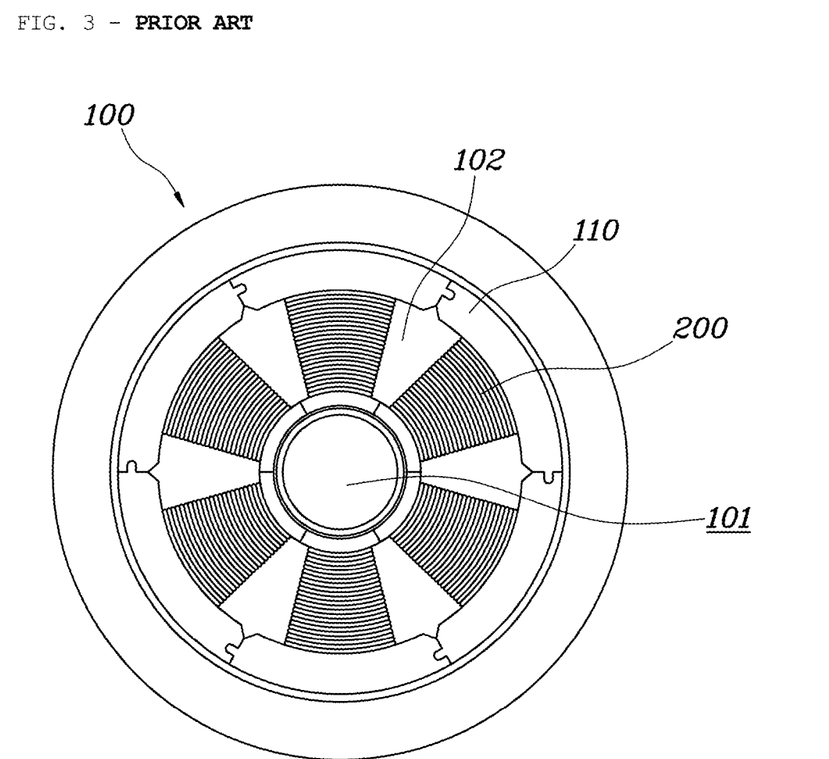
FIG. 3 is a view illustrating a stator of a motor with coils coiled around teeth of the stator according to the related art.
Figure 4A:
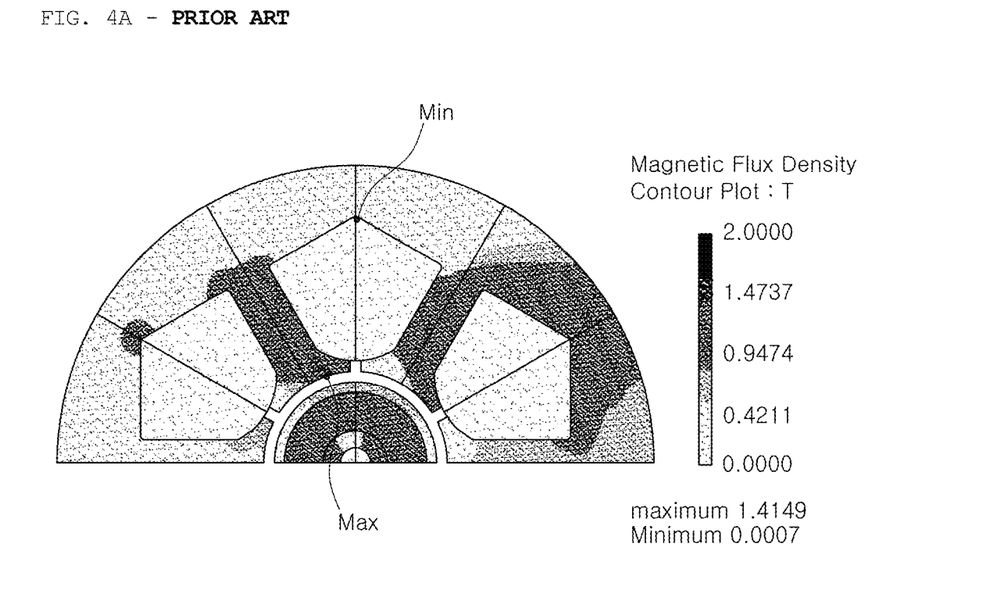
FIGS. 4A and 4B are views illustrating magnetic flux density and iron loss of the stator of the motor according to the related art, respectively.
Figure 4B:
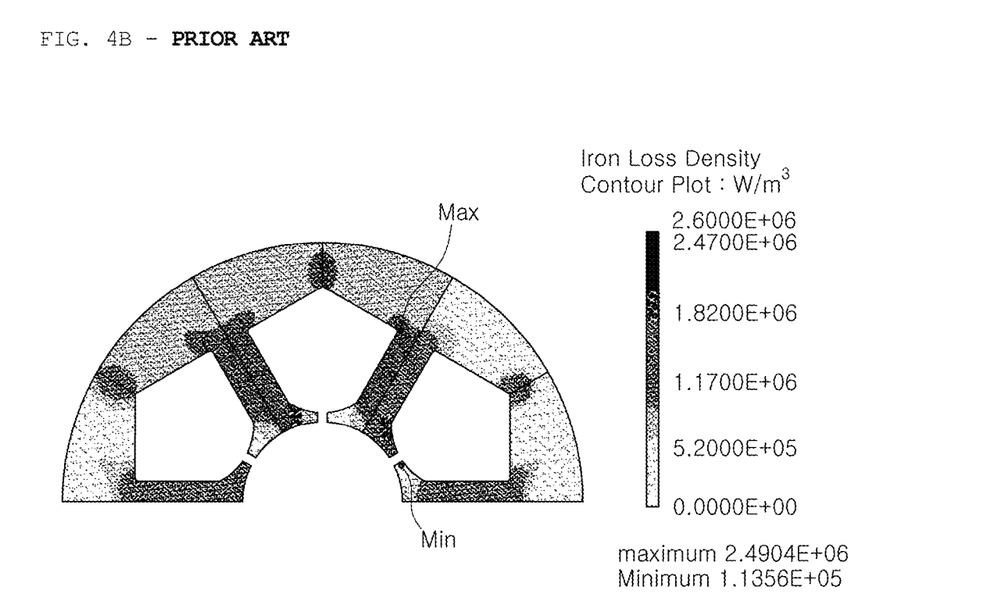

FIG. 3 is a view illustrating the stator of the motor with the coils coiled around teeth of the stator according to the related art. FIGS. 4A and 4B are views illustrating magnetic flux density and iron loss of the stator of the motor according to the related art, respectively.

As shown in FIG. 3, and FIGS. 4A and 4B, in the stator of the motor according to the related art, parts of the teeth 112 with coils coiled around the parts illustrate high magnetic flux density and high iron loss, and spaces between the teeth with the coil coiled around the teeth illustrate high iron loss due to magnetic flux leakage.

Due to high magnetic flux leakage and the high iron loss described above, performance of an AC motor deteriorates. Thus, technical development is urgently required to minimize magnetic flux leakage and iron loss.

The foregoing is intended merely to aid in the understanding of the background, and is not intended to mean that the present disclosure falls within the purview of the related art that is already known to those skilled in the art.

SUMMARY AND DESCRIPTION

Accordingly, the present disclosure has been made keeping in mind the above problems occurring in the related art, and the present disclosure is intended to propose a manufacturing method of a stator for a high efficiency motor whereby the stator is capable of improving performance of the motor by minimizing spaces between teeth of the stator with coils coiled around the teeth and by preventing magnetic flux leakage and iron loss from occurring.

In order to achieve the above object, according to one aspect, a manufacturing method of a stator for a high efficiency motor is provided. The method includes: preparing filling powder by coating a surface of soft magnetic powder with an insulating layer; providing a stator core partitioned into a center hole and inner spaces, the stator core including a yoke portion and a plurality of teeth; coiling coils around the plurality of teeth located in the inner spaces, respectively; and filling the inner spaces with a mixture of the filling powder and an adhesive, and curing the mixture of the filling powder and the adhesive.

The preparing of the filling powder may include: mixing the soft magnetic powder, insulation powder, and a reaction accelerator together to prepare a first mixture powder; milling the first mixture powder so that the insulation powder adheres to the surface of the soft magnetic powder to prepare a second mixture powder; and heat-treating the second mixture powder so that the insulating layer is formed on the surface of the soft magnetic powder to prepare the filling powder.

In the mixing of the soft magnetic powder, the insulation powder, and the reaction accelerator, the insulation powder may be alumina powder and the reaction accelerator may be ammonium chloride powder.

In the mixing of the soft magnetic powder, the insulation powder, and the reaction accelerator, the first mixture powder may be prepared by mixing the soft magnetic powder, the alumina powder, and the ammonium chloride powder at a mass ratio of 60-90:9-39:1, respectively.

In the heat-treating of the second mixture powder, the second mixture powder may be heat-treated at a temperature of 750-1300° C. for 10-24 hours, for example, to form the insulating layer on the surface of the soft magnetic powder.

The method may further include forming core covers by applying the mixture to upper and lower surfaces of the stator core filled with the mixture, and by curing the mixture after the filling of the inner spaces.

In the providing of the stator core, the stator core may be provided in such a way that a plurality of split cores having respective back yokes and teeth is radially disposed to form the center hole and the inner spaces.

A stator for a high efficiency motor, the stator includes: a stator core partitioned into a center hole and inner spaces, the stator core including a yoke portion and a plurality of teeth; coils coiled around the plurality of teeth, respectively; and filling parts filling the inner spaces, respectively, to prevent magnetic flux leakage from occurring between the coils coiled around the plurality of teeth.

The stator core may be provided in such a way that a plurality of split cores having respective back yokes and teeth is radially disposed to form the center hole and the inner spaces.

The plurality of split cores having the respective back yokes and the teeth may be radially disposed, each of the back yokes being provided with a coupling protrusion formed on a first side thereof, and with a coupling groove formed on a second side thereof.

The stator may further include a pair of core covers coupled to upper and lower surfaces of the stator core, respectively.

The filling parts and the core covers may be made of filling powder provided by coating a surface of soft magnetic powder with an insulating layer made of alumina.

The present embodiments are advantageous as follows. The present embodiments can minimize magnetic flux leakage and iron loss by filling spaces between a plurality of radially disposed teeth having coils coiled around the teeth with a soft magnetic mixture. Thus, the present embodiments can improve efficiency of a motor.

Furthermore, the present embodiments can improve efficiency and torque of a motor and can reduce size and weight of the motor by preventing magnetic flux leakage and iron loss generated from upper and lower surfaces of a stator of the motor and by gathering magnetic flux. Thus, the present embodiments can reduce weight of a vehicle and improve fuel efficiency.

Furthermore, the present embodiments can improve performance of a stator for a high efficiency motor and can reduce a size of the stator by preventing magnetic flux leakage and by gathering magnetic flux. Thus, a light weight vehicle can be realized by the stator.

BRIEF DESCRIPTION OF THE DRAWINGS

The above and other objects, features and other advantages are more clearly understood from the following detailed description when taken in conjunction with the accompanying drawings, in which.

DETAILED DESCRIPTION

Hereinbelow, exemplary embodiments are described in detail with reference to the accompanying drawings. Throughout the drawings, the same reference numerals will refer to the same or like parts.

Figure 5:
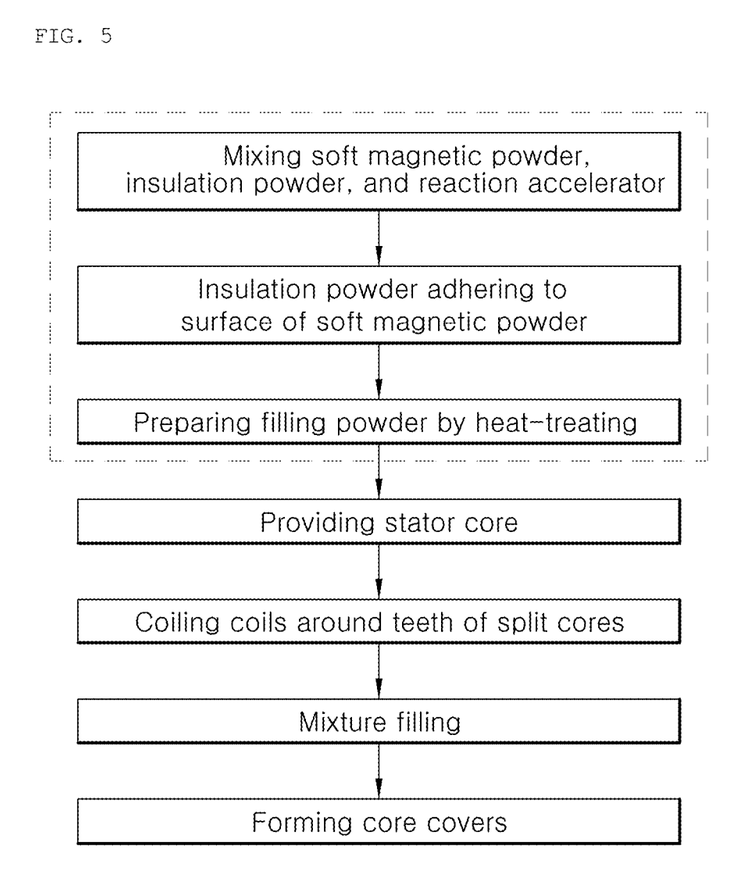
FIG. 5 is a diagram illustrating a manufacturing method of a stator for a high efficiency motor according to an embodiment.

FIG. 5 is a diagram illustrating a manufacturing method of a stator for a high efficiency motor according to an embodiment.

As shown in FIG. 5, the method according to an embodiment includes: preparing filling powder 10; providing a stator core 100 partitioned into a center hole 101 and inner spaces 102, the stator core 100 including a yoke portion 110 and a plurality of teeth 112; coiling coils 200 around the teeth 112 of split cores 100a, respectively; and filling the inner spaces 102 with a mixture of the filling powder 10 and an adhesive.

The preparing of the filling powder 10 provided by coating a surface of soft magnetic powder 11 with an insulating layer 12 includes: mixing, milling, and heat-treating processes.

In the mixing process, a first mixture powder is prepared by mixing the soft magnetic powder 11, insulation powder, and a reaction accelerator together.

A soft magnetic material having high magnetic flux density may be utilized as the soft magnetic powder 11. The soft magnetic material may be: Fe, Fe—Si, Fe—Co, Fe—Ni, Fe—Al, Fe—Si—Al, Ni—Fe—Mo, Fe—Si—Cr, Fe—Si—Cr—Al, Fe—Si—B, Fe—Si—B—Cu—Nb, Mn—Zn ferrite, or Ni—Zn ferrite.

Furthermore, the insulation powder prevents the coils 200 respectively coiled around the teeth 112 and located in the inner spaces 102 of the stator core 100 from applying an electric current to each other. Alumina powder $Al_2O_3$ may be utilized as the insulation powder.

In this case, the insulation powder is not limited to the alumina powder. Further, an inorganic oxide, such as silicon oxide, or various materials, such as phosphate, resin, and glass materials, may be selectively utilized as the insulation powder as long as the materials have insulating properties to prevent the neighboring coils 200 from applying an electric current to each other.

The reaction accelerator made of ammonium chloride $NH_4Cl$ is utilized to improve reactivity of the insulation powder made of alumina.

In the mixing process, the soft magnetic powder 11, the insulation powder, and the reaction accelerator may be mixed with each other at a mass ratio of 60-90:9-39:1, respectively, to prepare the first mixture powder.

In this case, when the mass ratio departs from the above ranges, the insulating layer 12 is insufficiently formed, and magnetic flux leakage is increased. Further, due to lack of soft magnetism, magnetic performance is decreased. Thus, it is desirable that the mass ratio is determined within the above ranges.

When the first mixture powder is prepared, in the milling process, the insulation powder adheres to the surface of the soft magnetic powder 11 by milling the first mixture powder with a ball mill for 10-24 hours, for example, to prepare second mixture powder.

In this case, when the first mixture powder is milled for less than 10 hours, the soft magnetic powder 11 and the insulation powder are not uniformly mixed with each other, and the insulation powder does not sufficiently adhere to the surface of the soft magnetic powder 11. Further, when the first mixture powder is milled for more than 24 hours, production costs are increased. Thus, it is desirable that the milling time is determined within the above time range.

Figure 6:
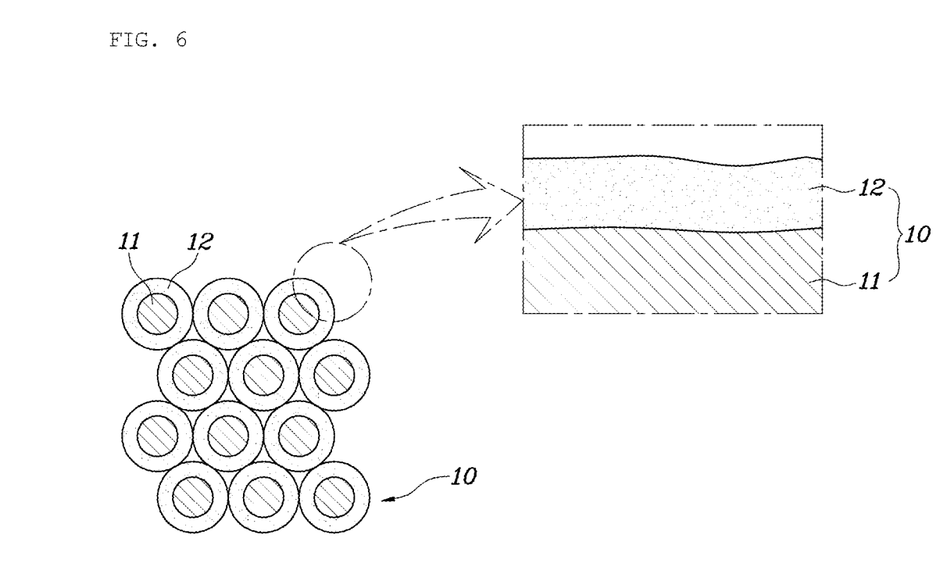
FIG. 6 is a view illustrating filling powder according to an embodiment.

FIG. 6 is a view illustrating the filling powder according to an embodiment.

As shown in FIG. 6, when the second mixture powder is prepared, the insulation powder adhering to the surface of the soft magnetic powder 11 is spread by heat-treating the second mixture powder at a temperature of 750-1300° C. for 10-24 hours, for example, so that the insulating layer is formed on the surface of the soft magnetic powder 11 to prepare the filling powder 10.

In this case, when the second mixture powder is heat-treated at a temperature of less than 750° C. or for less than 10 hours, the insulation powder made of alumina is not sufficiently spread, and the insulating layer 12 is not sufficiently formed. Further, when the second mixture powder is heat-treated at a temperature of more than 1300° C. or for more than 24 hours, manufacturing costs are increased. Thus, it is desirable that a temperature and time of the heat-treating process are determined within the above ranges.

When the filling powder 10 is prepared, in the providing of the stator core 100, the stator core 100 including the yoke portion 110 and the plurality of teeth 112 is integrally manufactured such that the stator core 100 is partitioned into the center hole 101 and the inner spaces 102. Alternatively, after the split cores 100a having respective back yokes 111 and teeth 112 are manufactured, the split cores 100a are radially disposed, and the back yokes 111 of the split cores 100a are coupled to each other to form the yoke portion 110. Thus, the stator core 100 including the center hole 101 and the inner spaces 102 is provided.

As described, when the stator core 100 is provided, in the coiling of the coils, the coils 200 are coiled around the teeth 112 of the split cores 100a located in the inner spaces 102, respectively.

As described, when the stator core 100 with the coils 200 coiled around the teeth 112 is provided, in the filling of the inner spaces, the stator for the high efficiency motor is manufactured by filling the inner spaces 102 of the stator core 100 with the mixture of the filling powder 10 prepared in the preparing of the filling powder 10 and the adhesive, and by curing the mixture of the filling powder 10 and the adhesive.

In this regard, in the filling powder 10 filling the inner spaces 102, the soft magnetic powder 11 prevents magnetic flux leakage from occurring, and the insulating layer 12 applied on the surface of the soft magnetic powder 11 prevents the coils 200 disposed adjacently to each other in the inner spaces 102 from applying an electric current to each other.

That is, performance of the stator for the high efficiency motor may be improved in such a way that the filling powder 10 prevents magnetic flux leakage from occurring and gathers magnetic flux.

The method may further include forming core covers 400 by applying the mixture to upper and lower surfaces of the stator core 100 filled with the mixture, and by curing the mixture after the filling of the inner spaces.

In this case, magnetic flux leakage from the open upper and lower surfaces of the stator core 100 may be prevented, and magnetic flux may be gathered by being guided by the core covers 400. Thus, performance of the stator for the high efficiency motor may be improved, and a size of the stator for the high efficiency motor may be reduced.

Hereinbelow, the stator for the high efficiency motor according to an embodiment is described in detail with reference to the accompanying drawings.

Figure 7:
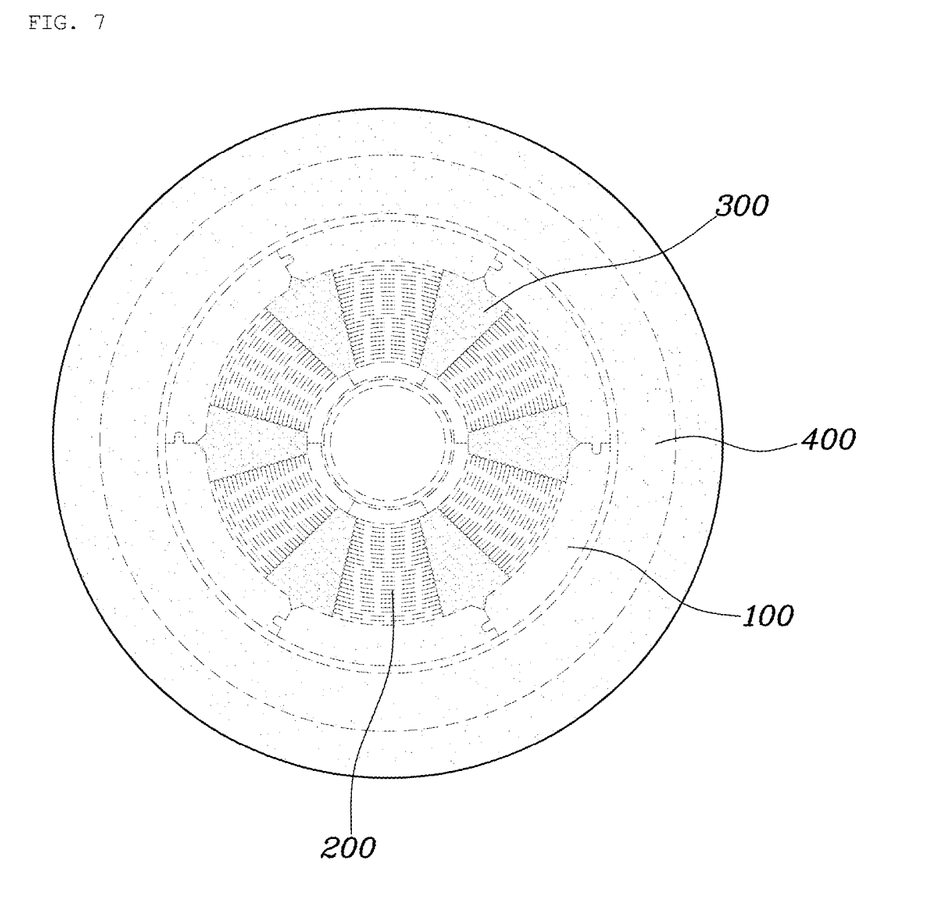
FIG. 7 is a plan view illustrating the stator for the high efficiency motor according to an embodiment.
Figure 8:
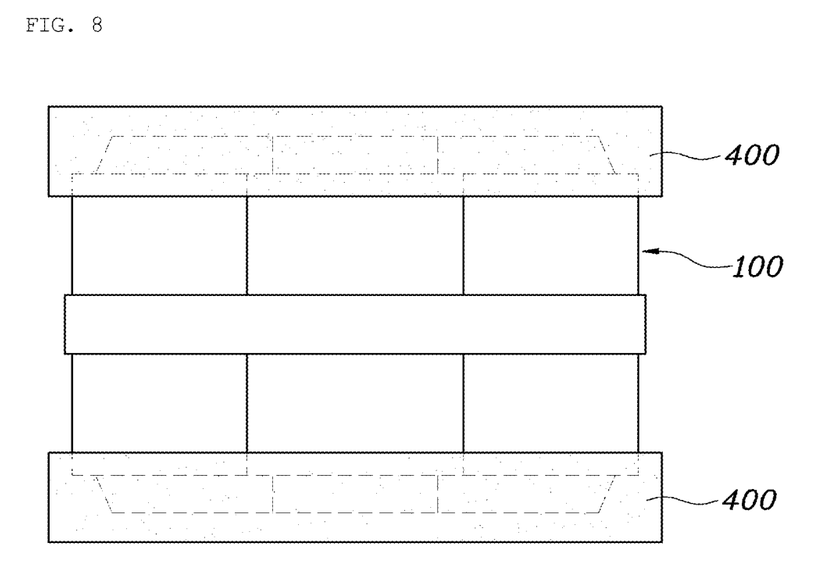
FIG. 8 is a side view illustrating the stator for the high efficiency motor according to an embodiment.

FIG. 7 is a plan view illustrating the stator for the high efficiency motor according to an embodiment, and FIG. 8 is a side view illustrating the stator for the high efficiency motor according to an embodiment.

As shown in FIGS. 7 and 8, the stator for the high efficiency motor according to an embodiment includes: the stator core 100; the coils 200; and filling parts 300.

The stator core 100 is provided in such a way that the stator core 100 including the yoke portion 110 and the plurality of teeth 112 is integrally manufactured such that the center hole 101 and the inner spaces 102 are formed in the stator core 100. Alternatively, the stator core 100 is provided in such a way that the plurality of split cores 100a having respective back yokes 111 and teeth 112 is radially disposed.

In this regard, in each of the split cores 100a according to an embodiment, a coupling protrusion 111a may be formed on a first side of the back yoke 111, and a coupling groove 111b corresponding to the coupling protrusion 111a may be formed on a second side of the back yoke 111.

In this case, the plurality of split cores 100a is radially disposed, and the coupling protrusions 111a are inserted into the neighboring coupling grooves 111b so that the stator core 100 is provided. Thus, it is advantageous in that the stator core 100 may be easily assembled.

The stator for the high efficiency motor may further include: the pair of core covers 400 coupled to the upper and lower surfaces of the stator core 100, respectively. Further, the filling parts 300 and the core covers 400 according to an embodiment may be made of the filling powder 10 provided by coating the surface of the soft magnetic powder 11 with the insulating layer 12.

Figure 9:
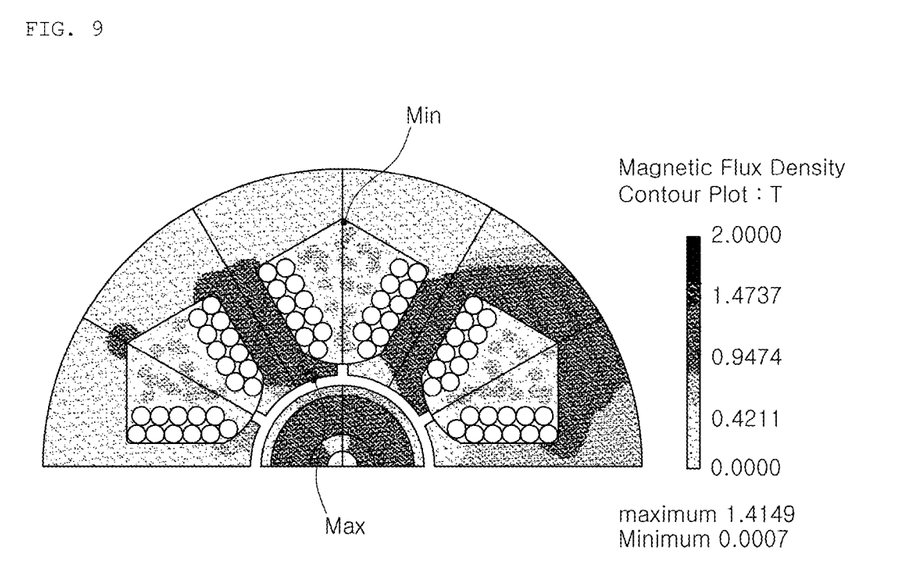
FIG. 9 is a view illustrating magnetic flux density and iron loss of the stator for the high efficiency motor according to an embodiment.

FIG. 9 is a view illustrating magnetic flux density and iron loss of the stator for the high efficiency motor according to an embodiment.

As shown in FIG. 9, in the stator for the high efficiency motor according to an embodiment, the filling parts 300 are formed by filling spaces between coils coiled around the teeth 112 with the filling powder 10. Thus, compared to the related art, iron loss is reduced in such a way that magnetic flux is gathered and magnetic flux leakage is prevented from occurring by the filling parts 300.

As described, according to an embodiment, it is advantageous in that iron loss of the stator for the high efficiency motor may be minimized and performance of the stator for the high efficiency motor may be improved in such a way that magnetic flux is gathered and magnetic flux leakage is prevented from occurring. Furthermore, it is advantageous in that a size of a motor may be reduced by using the stator according to an embodiment.

Although embodiments have been described for illustrative purposes, those skilled in the art will appreciate that various modifications, additions, and substitutions are possible, without departing from the scope and spirit of the disclosure as disclosed in the accompanying claims. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A stator for a high efficiency motor, the stator comprising:

a stator core partitioned into a center hole and inner spaces, the stator core including a yoke portion and a plurality of teeth;

coils coiled around the plurality of teeth, respectively;

filling parts filling the inner spaces, respectively; and a pair of core covers coupled to upper and lower surfaces of the stator core, respectively, wherein the filling parts are configured to prevent magnetic flux leakage from occurring between the coils coiled around the plurality of teeth, and wherein the filling parts and the core covers are made of filling powder provided by coating a surface of soft magnetic powder with an insulating layer made of alumina.

2. The stator of claim 1, wherein the stator core is configured such that a plurality of split cores having respective back yokes and teeth is radially disposed to form the center hole and the inner spaces.

3. The stator of claim 2, wherein each back yoke comprises a coupling protrusion formed on a first side thereof and a coupling groove formed on a second side thereof.

* * * * *